No. 614,393. Patented Nov. 15, 1898.
T. B. JEFFERY.
COVER FOR PNEUMATIC TIRES.
(Application filed Jan. 26, 1894.)
(No Model.)
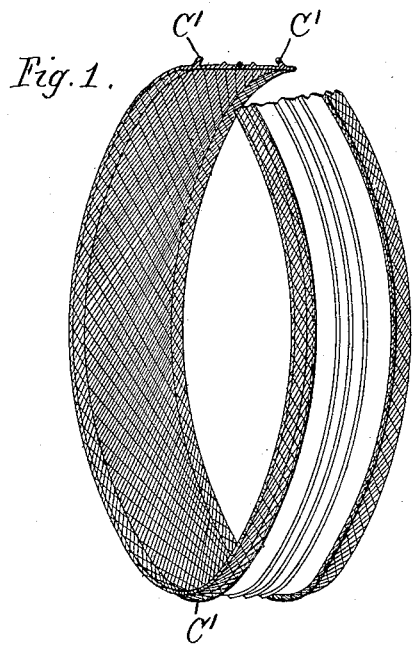
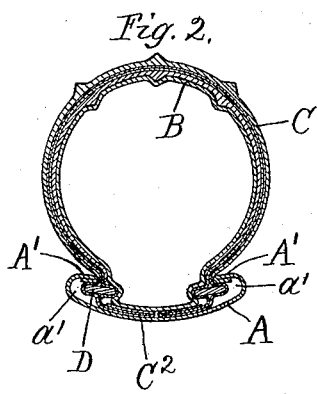
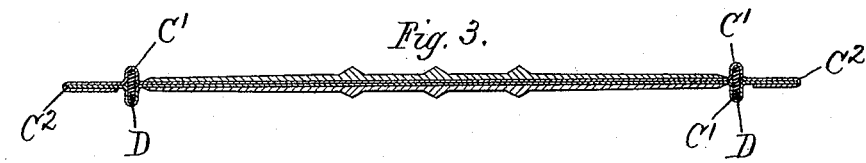
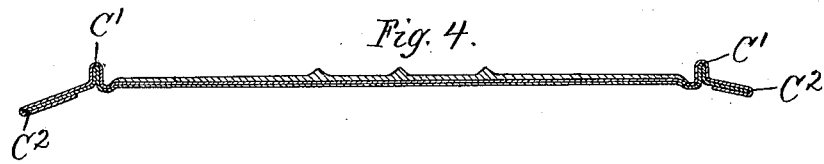
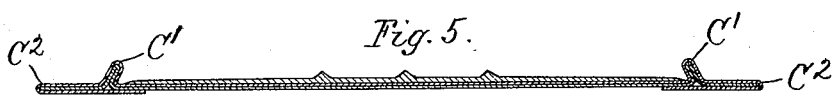
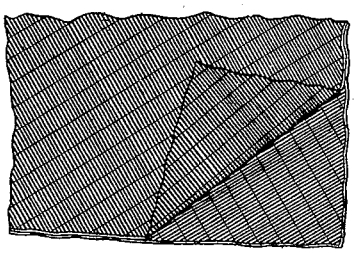
Witnesses.
E. T. Wray.
Jean Elliott
Inventor
Thos. B. Jeffery
by Burton and Burton
his attys.
THE NORRIS PETERS CO., PHOTO-LITHO., WASHINGTON, D. C.

UNITED STATES PATENT OFFICE.

THOMAS B. JEFFERY, OF CHICAGO, ILLINOIS.

COVER FOR PNEUMATIC TIRES.

SPECIFICATION forming part of Letters Patent No. 614,393, dated November 15, 1898.

Application filed January 26, 1894. Serial No. 498,159. (No model.)

*To all whom it may concern:*

Be it known that I, THOMAS B. JEFFERY, a citizen of the United States, residing at Chicago, county of Cook, and State of Illinois, have invented certain new and useful Improvements in Covers for Pneumatic Tires, (for which there have been granted to me British Letters Patent No. 3,387, dated February 16, 1894, and French Patent No. 242,834, dated November 13, 1894,) which are fully set forth in the following specification, reference being had to the accompanying drawings, forming a part thereof.

This invention relates to covers or sheaths for pneumatic tires for wheels.

In the drawings, Figure 1 is a perspective of my improved tire-cover in one of its forms, having a piece broken out to show it in cross-section at one point. Fig. 2 is a cross-section of the complete tire and wheel-rim in which it is seated, the tire-cover embodying my invention in a slightly-modified form. Fig. 3 is a detail cross-section of the tire-cover in the form which is shown in Fig. 2, section being made from the cover in its normal form before it is placed on the wheel. Fig. 4 is a section similar to Fig. 3—that is, made through the tire-cover in its normal form—showing a slight modification from either of the two preceding forms. Fig. 5 is a detail plan of two pieces of fabric which are used in making my improved tire-cover, designed to show the character of the web or arrangement of threads. Fig. 6 is a magnified sectional detail of a piece of my tire-cover designed to show the construction and arrangement of the several layers without regard to the exterior form which is shown in the principal figures.

Heretofore it has been customary to make covers for pneumatic tires by molding them in the tubular or cylindrical form which they necessarily assume when in use on the wheel, such tube, split or rifted at the inner circumference, being either made in an endless circuit or ring to fit about the wheel or being made in the form of a straight tube and wrapped about the wheel, having its ends joined. My improved tire-cover differs from these familiar forms, first, in that it is made as a simple endless band or short cylinder whose diameter is approximately that of the wheel which the tire is to fit and whose height or length is substantially the circumference of the tire-tube, as if such a tube, having been split or rifted at the inner circumference, should be then flattened out transversely, retaining the form of a ring or band of the diameter of the wheel. One advantage of making the cover in the form of such a band instead of molding it in the tubular form which is customary is that when its lateral edges are folded inward, making it enwrap the core transversely, the natural reaction of the cover tends to force the edges apart and so greatly assists their engagement with the rim when such engagement is effected by a means which I consider especially desirable—to wit, ribs or lips on the cover fitting recesses formed by means of overhanging lips or flanges on the rim. Another advantage of this form is that it is much cheaper in construction and much more economical and convenient in storage and shipment than the tubular form. Another advantage is that it can readily be made alike on both sides, and therefore adapted to be turned and worn either side out, giving it double the life of a cover of the old construction.

Another distinguishing feature of my invention is the formation of the ribs or ridges which constitute the beads or lips of the cover which engage the rim, these beads being formed by creasing or folding the fabric of the band at two parallel lines near the edges, forming substantially U-shaped grooves upon one side and correspondingly-shaped projections or ridges on the other side, the fabric being filled or saturated with a stiffening substance, causing these bends to be permanent when the cover is completed, or such bends being filled with a cord or strip, and thereby being rendered permanent, or their permanence being secured by both these means, which may be employed simultaneously.

A is the wheel-rim, having the inturned flanges A' A', forming the recesses a' a' for the engagement of the beads or ribs or lips with which the cover may be provided.

B is the inflatable core.

C is the cover, in which my invention consists. In Figs. 2 and 3 I have shown this cover in a form adapted to be worn either side out, and in this form, as well as all of the other forms in which it is shown, it is first made in the general form of a short cylinder or band, as illustrated in Fig. 1, which, however, represents in detail a tire-cover which is not double or adapted to be worn either side out, but has the tread and engaging ribs only upon one side. In each of the forms, however, a short cylinder, approximately of the diameter of the wheel to be fitted, is made, as shown in Fig. 1, with beads or lips C' C' at a distance apart corresponding to the exterior portion of the circumference of the tire from lip to lip of the rim in which it is to be seated. Between these two ribs the tire-cover may be provided with any desired form of rubber covering for the tread. I have shown in several of the figures a roughened or ribbed tread; but it will be understood that this feature stands for any desired form of tread-surface.
The beads or ribs C' C' will usually be placed a little distance from the lateral edges of the band which forms the tire-cover, leaving the portions $C^2$ $C^2$ outside of them, which occupy a position and perform a service within the rim when the tire-cover is in use which will be further mentioned. Many variations of the form of the bead or lip C' and of the precise relation thereto of the exterior portion $C^2$ may be made, according to the precise form of the rim to which the tire is adapted, and I have represented the simple form shown in Fig. 1, the double or reversible form shown in Figs. 2 and 3, and a third form shown in Fig. 4 chiefly to indicate the capacity for modification of my invention without departing from its substance. In the form shown in Fig. 4 the marginal wings $C^2$ $C^2$ are at a slight angle to the middle or tread portion, which will be effected in the making by suitably shaping the molding-wheel on which the tire-cover is formed. This adapts the wings to assume a certain position with respect to each other when the cover is wrapped about the core on the wheel, adapting them to operate as lever-bases which are pressed by the core as the latter is inflated, according to the principle and method set out in my Patent No. 466,789, dated January 12, 1892, and the specific shape of the beads or ribs C' in this form is also specially adapted to afford secure engagement under the overhanging lips or flanges of the rim.

Specifically, as above stated, my invention involves in its most desirable form the ribs or beads C' on the band, made by forcing the U-shaped fold or crease into the band and in any manner stiffening the material in that form to render the shape permanent. In the form shown in Fig. 1 and also in that shown in Fig. 4, creasing of the fabric being accomplished by any suitable means, the permanence of the rib thus made is effected by stiffening material with which the fabric is filled or saturated. It will be understood that fabric charged with rubber gum being used for this purpose, and being thereby rendered very adhesive, will retain the form into which it may be forced in making such a groove and bead by the adhesion of its folds upon each other and that being subsequently vulcanized absolute permanence of the bead will be obtained and that even without vulcanizing a sufficient degree of permanence to serve quite well the purpose in question is possible. In the form shown in Figs. 2 and 3 the stiffening and further reinforcing of the lip or bead is effected by filling the groove with a suitable strip D. If it were desired to make a cover to be worn only one side out, this filling-strip D would be made only large enough to occupy the groove formed in the fabric; but when it is desired to make a double cover, or one adapted to be reversed, the filling-strip may be made large enough to protrude from the surface, and another fabric layer being applied outside and stretched over the ribs formed by the protruding filling-strip, and, being either in that process or preparatory to it grooved in the same manner as the first fabric layer was grooved to receive the filling-strips, the tire-cover is made double, as shown.

When the band has been formed in the manner described, it is applied to the wheel by folding its edges inward toward each other, bringing the ribs or beads C' into position to enter the recesses $a'$ in the rim, the inflatable core being narrowed within it in that process and the marginal portions $C^2$ extending within the rim underneath the core and subject to its pressure when inflated. The action and qualities of the complete tire thus formed has been fully set out in former patents and is familiar; and the mode of applying and using it is thus mentioned in order to call attention to the fact that the band when thus folded forms something of the nature of a tube around the core, and, when the core is inflated, distends this tube symmetrically, the circumference at the tread being greater than at the lines of engagement of the cover with the rim, and the cover must be stretched at the middle part as compared with the edges or with the locating-lines of the beads C' C'. In order to adapt it to stretch thus and to cause it in stretching to preserve a symmetrical form and not become distorted in stretching, I make the band of bias-cut fabric, using two layers of such fabric and interposing between them a thin layer or film of rubber or like substance which will be both yielding and elastic—that is, adapted both to be stretched and to be compressed and to follow readily, therefore, all the movements of the threads of both layers of the bias fabric. A very fair degree of utility would be obtained by using for both the layers fabric of common construction, as cotton duck or sheeting, having the same number and quality of threads running both ways and woven with those threads under substantially the same tension, so far as possible, and having both layers cut bias in the same direction of the cloth; but inasmuch as there is a difference in the tension of the warp and filling of any ordinarily-woven fabric, so that the fabric will stretch more freely in one direction than the other, bias strips cut in directions at right angles to each other from the same fabric exhibit different capacity for stretching, and in order to equalize these different capacities and cause the stretch of the tire-cover made from them to be such as to cause it to stretch symmetrically the two bias strips when made from the same fabric, and that fabric of common construction, should be cut from such fabric opposite ways of the bias. I prefer, however, to use a special fabric, in which the threads in one direction are sparse and those in the other as close as usual, and to make the layers of strip cut opposite ways of the bias of such fabric. It will be obvious that this fabric will be strong in one direction and yielding in the other and the two bias strips, one of which has the direction of strength at right angles to the direction of strength of the other, will move relatively to each other as the tire-cover is stretched at the middle under the inflation of the core, and as it is stretched and relaxed in use of the tire on the wheel in riding the layer of rubber between preventing friction of the threads upon each other and by its elasticity assisting in drawing each layer back to its normal position when the local pressure which causes the distortion or stretching is passed. This structure therefore makes a cover with peculiar quality for accommodating itself to the varying conditions of its use over an inflated core.

In order to give the edge a finished character, one of the layers of bias fabric is made wider than the other and the excess at both sides is folded back over the edges of the narrower piece, as seen in the drawings. A very efficient mode of rendering permanent the beads formed by the creasing of the fabric is to apply an adhesive strip of fabric over the crease opposite the bead. This is most easily done by making the excess of width of one of the pieces enough to reach inward past the crease and lap and secure it, as described. Such a construction is shown in Fig. 5. Usually the filling or other reinforcement of the beads will be of such material as to have some elasticity, so that in folding the band into a form of the tire the beads and edges will be somewhat compressed, while the center will be stretched to permit the tire under inflation to assume the proper cylindrical form; but in some forms of tire and rim a non-elastic cord or filling is employed to reinforce the beads and for other purposes, and in that case the accommodation to the cylindrical form is obtained wholly by the stretch of the fabric at the center, and for such tires the double bias fabric is especially important.

I claim—

A tire-cover in the form of an endless band or short cylinder consisting of a plurality of layers of bias fabric creased upon one surface to form parallel beads or ridges upon the opposite surface near the edges respectively, an additional strip or strips of adhesive fabric applied upon the creased side spanning the creases to render the beads permanent: substantially as set forth.

In testimony whereof I have hereunto set my hand, at Chicago, Illinois, this 17th day of January, 1894.

THOS. B. JEFFERY.

Witnesses:
  CHAS. S. BURTON,
  JEAN ELLIOTT.